Figure 1:
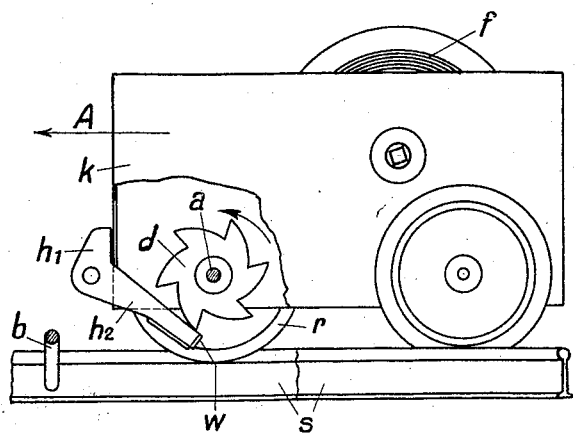

July 5, 1927.

E. SCHLIEDERER

TOY

Filed Nov. 22, 1926

1,634,756

Inventor:
Emil Schliederer
by ............
Atty.

Patented July 5, 1927.

1,634,756

UNITED STATES PATENT OFFICE.

EMIL SCHLIEDERER, OF NUREMBERG, GERMANY, ASSIGNOR TO THE FIRM: BING-WERKE, VORM. GEBR. BING AKTIENGESELLSCHAFT.

TOY.

Application filed November 22, 1926, Serial No. 150,060, and in Germany December 7, 1925.

My invention refers to toys and more especially to toy vehicles, such as locomotives or the like, running on a track. It is an object of my invention to provide means for automatically braking such vehicles and to release the braking means in a simpler and more efficient manner than was hitherto possible.

Automatic braking mechanism for toy railways as hitherto designed comprises a lever at the bottom of the locomotive controlling a brake of some sort and an adjustable lever disposed between the rails and adapted, when thrown in, to cause the braking lever to be turned and the brake to be operated. In order to restart the train, the brake must be manually released by means of a separate lever or slide disposed on the locomotive casing or in the driver's stand. The mounting in place as well as the handling of this lever has proved to be inconvenient.

The braking device according to the present invention, while being actuated also by a stop arranged between the rails of the track, can be released automatically by a small backward movement imparted to the locomotive.

In the drawings affixed to this specification and forming part thereof the chassis of a toy locomotive embodying my invention is illustrated diagrammatically by way of example.

In the drawings

Figure 2:
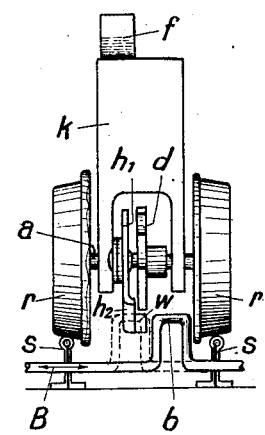
Figure 3:
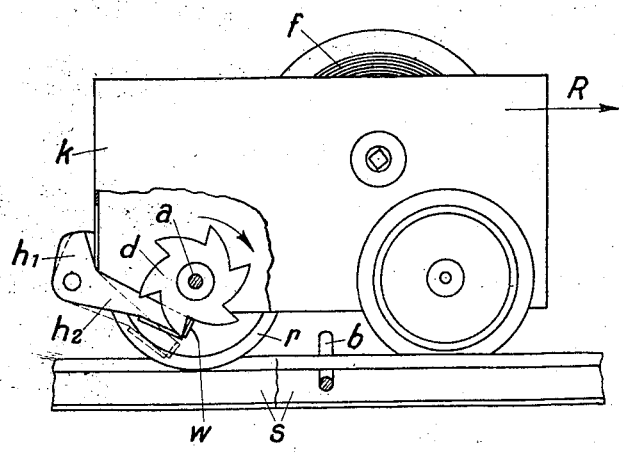

Figs. 1 and 3 are side elevations, showing the parts in position before and after braking, respectively, and Fig. 2 is an end view.

Referring to the drawings, $a$ is the wheel axle, $r$ is a pair of running wheels, and $d$ is a ratchet wheel mounted on the axle. $f$ is the spring driving the axle. $k$ is the vehicle frame and $h_1$ $h_2$ is a double arm lever pivotally mounted on the front wall of the frame, its rear arm $h_2$ hanging clear of the ratchet wheel by its own weight. $w$ is a nose on said arm extending at right angles thereto and capable, when the pawl lever is lifted, to engage with and be frictionally retained by the ratchet wheel.

$b$ is a stop supported and adjustable in holes of the track rails $s$ in the direction of the arrows B. If it is desired to brake the vehicle, the stop $b$ is adjusted to extend into the way of the nose $w$ of the pawl $h_2$ and to lift it into engagement with the ratchet wheel $d$, when the locomotive overrides the stop. When the locomotive has thus been braked and it is now desired to release the brake, the locomotive need only be moved backwards, a movement of a few millimetres sufficing to cause the ratchet wheel to rotate backward so as to sever the frictional contact between the pawl and ratchet wheel and to allow the pawl to drop into its initial position under its own weight.

I wish it to be understood that I do not desire to be limited to the exact details of construction shown and described for obvious modifications will occur to a person skilled in the art.

I claim:—

1. Toy comprising a track, a pair of wheels adapted to travel on said track, a ratchet wheel associated with said wheels, a pawl adapted to cooperate with said ratchet wheel in arresting said pair of wheels and means associated with said track for bringing said pawl in engagement with said ratchet wheel.

2. Toy comprising a track, a pair of wheels adapted to travel on said track, a ratchet wheel associated with said wheels, a pawl adapted to cooperate with said ratchet wheel in arresting said pair of wheels and adjustable means associated with said track for bringing said pawl in engagement with said ratchet wheel.

3. Toy comprising a track, a pair of wheels adapted to travel on said track, a ratchet wheel associated with said wheels, a pawl adapted to cooperate with said ratchet wheel in arresting said pair of wheels and means associated with said track for bringing said pawl in engagement with said ratchet wheel, said ratchet wheel and pawl being arranged to become disengaged automatically by a return movement of said pair of wheels.

4. Toy comprising a track, a wheel axle, a pair of running wheels and a ratchet wheel on said axle, a pawl arranged near said ratchet wheel and adapted to be locked in lifted position by frictional engagement with said ratchet wheel and a check on said track adapted, when in operative position, to extend into the way of said pawl and to lift it into engagement with said ratchet wheel.

In testimony whereof I affix my signature.

EMIL SCHLIEDERER.